United States Patent [19]
Lohrberg et al.

[11] Patent Number: 5,167,939
[45] Date of Patent: Dec. 1, 1992

[54] PROCESS FOR REMOVING CALCIUM AND MAGNESIUM IONS FROM AN AQUEOUS ALKALI CHLORIDE SOLUTION FOR USE IN MEMBRANE ELECTROLYSIS

[75] Inventors: Karl Lohrberg, Heusenstamm; Rainer Dworak, Wiesbaden, both of Fed. Rep. of Germany

[73] Assignee: Metallgesellschaft Aktiengesellschaft, Frankfurt am Main, Fed. Rep. of Germany

[21] Appl. No.: 741,311

[22] Filed: Aug. 7, 1991

[30] Foreign Application Priority Data
Aug. 9, 1990 [DE] Fed. Rep. of Germany ....... 4025195

[51] Int. Cl.$^5$ .................. C01F 5/00; C01F 11/00; B01D 11/00
[52] U.S. Cl. .................. 423/157; 423/155; 423/158
[58] Field of Search .......... 423/157, 155, 158; 204/98, 69, 70; 210/688; 75/745, 574, 605

[56] References Cited

U.S. PATENT DOCUMENTS

| | | | |
|---|---|---|---|
| 2,387,898 | 10/1945 | Grebe et al. | 423/157 |
| 2,409,861 | 10/1946 | Hunter et al. | 423/157 |
| 2,772,143 | 11/1956 | McIlhenny et al. | 423/157 |
| 3,341,290 | 9/1967 | Bornemann et al. | 423/157 |
| 4,839,003 | 6/1989 | Dworak et al. | 204/98 |

FOREIGN PATENT DOCUMENTS
0087934 9/1983 European Pat. Off. .

OTHER PUBLICATIONS
Chem. Abstracts 98:181961f.
Chem. Abstracts 98:37057y.
Chem. Abstracts 105:155577d.

*Primary Examiner*—Theodore Morris
*Assistant Examiner*—Edward Squillante
*Attorney, Agent, or Firm*—Herbert Dubno; Jonathan Myers

[57] ABSTRACT

The aqueous alkali chloride solution is coarsely purified first. In the succeeding fine purifier the solution, which contains calcium ions, magnesium ions and undissolved magnesium compounds, is passed through a plurality of purification stages (ion exchange stages), which contain cation exchange granulate. In the fine purifier the solution having a pH value of about 10 to 11 is passed through a first ion exchange stage and the solution coming from the first ion exchange is acidified to decrease its pH value by at least 0.5. The solution is subsequently passed through at least one second ion exchange stage and a solution which is virtually free of undissolved magnesium compounds is withdrawn from the fine purification means. The acidified solution fed to the second ion exchange stage has preferably a pH value of 5 to 10.

1 Claim, 1 Drawing Sheet

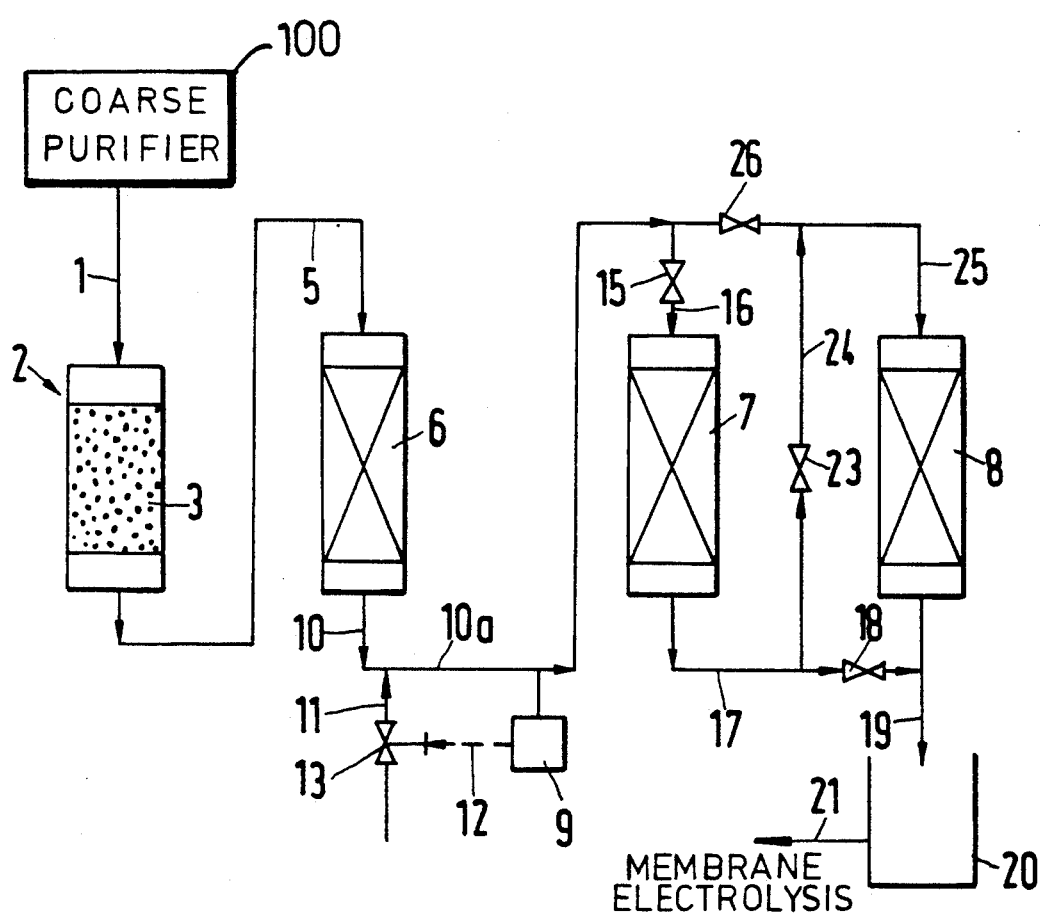

PROCESS FOR REMOVING CALCIUM AND MAGNESIUM IONS FROM AN AQUEOUS ALKALI CHLORIDE SOLUTION FOR USE IN MEMBRANE ELECTROLYSIS

FIELD OF THE INVENTION

Our present invention relates to a process for the fine purification of an aqueous alkali chloride solution which is used in membrane electrolysis, wherein the solution is first subjected to a coarse purification, an aqueous alkali chloride solution which contains calcium ions, magnesium ions and undissolved magnesium compounds is fed to a fine purifier downstream of the coarse purifier, and the solution is passed in the fine purifier through a plurality of purification stages (ion exchange stages), which contain cation exchange granulate.

BACKGROUND OF THE INVENTION

A purification process is known from German Patent 28 19 527 and serves to provides a finely purified solution having a calcium concentration not in excess of 0.08 mg/1. Details of the coarse purification and fine purification are also found in German Patent 36 37 939 and from the corresponding U.S. Pat. No. 4,839,003.

OBJECT OF THE INVENTION

It is an object of the invention to improve the fine purification of an aqueous alkali chloride solution which is intended for membrane electrolysis and substantially to decrease not only the calcium content but particularly also the magnesium content.

SUMMARY OF THE INVENTION

This is accomplished in accordance with the invention in that the solution having a pH of about 10 to 11 is passed in the fine purification means through a first ion exchange stage, the solution coming from the first ion exchange stage is acidified to decrease its pH by at least 0.5, the solution is then passed through at least a second ion exchange stage, and a solution which is virtually free from undissolved magnesium compounds is withdrawn from the fine purification means.

Cation exchange membranes are used in the membrane electrolysis and it is known that said membranes require an electrolyte in which the calcium ion content is as low as possible. It has now been found that the magnesium ion content of the electrolyte must also be extremely low if the membranes are to have a long life. Calcium and magnesium entering the electrolyte originate mainly from the rock salt used as a starting material for the alkali chloride solution.

In the known processes for fine purification, care is mainly taken to obtain a purified solution having a low calcium content. It has previously been overlooked that magnesium compounds which are relatively difficultly soluble pass through the ion exchange stages and thus enter the reservoir for the electrolyte, where they are gradually dissolved. In the membrane electrolysis the resulting higher content of magnesium ions results in disturbances in the cation exchange membranes.

In the process in accordance with the invention the fine purification stage comprises a first ion exchange stage, which is supplied with the solution which has the usual pH value in the range of about 10 to 11 so that it has a high capacity. As a result, the Ca and Mg ions are substantially adsorbed in the first ion exchange stage. The solution coming from the first stage is acidified to decrease its pH value by at least 0.5. That acidification highly improves the conditions for the dissolution of magnesium compounds, particularly $Mg(OH)_2$. As a result, virtually no undissolved magnesium compounds are supplied to the second ion exchange stage and the magnesium ions as well as the remaining calcium ions are removed from the solution in that second stage to a very low residual content.

The acidified solution fed to the second ion exchange stage preferably has a pH of 5 to 10 and in most cases not in excess of 9. Owing to the process in accordance with the invention, a solution in which the total concentration of Ca ions and Mg ions is not in excess of 0.05 mg/1 can be withdrawn from the fine purification means.

BRIEF DESCRIPTION OF THE DRAWING

The above and other objects, features and advantages of my invention will become more readily apparent from the following description, reference being made to the accompanying highly diagrammatic drawing in which the sole FIGURE of which is a flow diagram of the process of the invention.

SPECIFIC DESCRIPTION

From coarse purification means 100 an aqueous solution of sodium chloride or potassium chloride is fed in line 1. Such coarse purification means may comprise a thickener. Before the fine purification means, solids are partly removed first in an adsorber 2 as a precaution, e.g. by means of a fixed bed 3 of granular coke. The solution draining from the adsorber 2 is fed through line 5 to the line purifier which consists of the ion exchange stages 6, 7 and 8. The third stage 8 is not essential and may also selectively be operated. Cation exchange resin is used in all stages. The same resin or different resins may be used in various stages. Commercially available resin, such as Duolite ES 467 or LEWATIT TP 208 from Bayer AG may be used. Usually the temperatures in the ion exchange stages lie in the range of about 40° C. to 80° C. and liquid is passed through each stage per hour in an amount which corresponds to about 10 to 30 times the volume of the bed of ion exchange material.

The first ion exchange stage 6 of the fine purification means is fed through line 5 with a solution having a pH of about 10 to 11 so that the adsorption capacity will be utilized as fully as possible in that stage. The solution draining in line 10 is almost free of CA ions and Mg ions and the total content of these ions is less than 0.1 mg/1. But that solution still contains a remainder of undissolved magnesium compounds, particularly $Mg(OH)_2$. In most cases these Mg compounds consist of small crystals so that they can be removed only with difficulty.

Acid, such as HCl, is added through line 11 to the solution in line 10a so that the pH value of the solution is decreased by at least 0.5 and the solution then has a pH value of 5 to 10, preferably not in excess of 9. To check the decreased pH value, a pH detector 9 is provided downstream of the point where the acid is added and via a signal line 12 and a valve 13 in the acid line operates to adjust the desired pH value.

The acidified solution then flows through the opened valve 15 and the line 16 to the second ion exchange stage 7, where the magnesium ions and calcium ions which have newly been formed as a result of the acidification are removed. The finely purified solution leaves the stage 7 through the line 17 and through the opened valve 18 and the line 19 reaches a reservoir 20, from which the purified alkali chloride solution is withdrawn through the line 21 and supplied to the membrane electrolysis, not shown.

In a modification of the process a third ion exchange stage 8 is provided, which is used always or in case of need. During normal operation that stage 8 may be connected downstream of the second ion exchange stage 7 by opening of the valve 23 in line 24 is opened. The valve 18 is closed and the solution flowing through lines 24 and 25 is additionally passed through the stage 8 before entering the reservoir 20. During a regeneration of the second stage 7, it may be replaced by the third stage 8. In that case the valve 15 is closed and the solution is fed to the stage 8 through the line 10, the opened valve 26 and the line 25.

During the time in which the laden first ion exchange stage 6 is regenerated it is not necessary to shut down but it will be sufficient to directly transfer the solution from line 5 through a by-pass, not shown, into the line 10, to acidify the solution and to pass it through the stages 7 and 8 in succession. It will be obvious that another ion exchange column, not shown, may additionally be operated during the regeneration of the stage 6.

The regeneration of the cation exchange granulate of the ion exchange stages 6, 7 and 8 may be effected, for instance, in known manner by an aqueous solution which contains 1 to 10% by weight HCl.

SPECIFIC EXAMPLE

An aqueous rock salt solution is purified at a rate of 40m$^3$ per hour in a processing system as shown in the drawing. The solution fed in line 1 contains per liter mainly 305 g NaCl and 0.5 g Na$_2$CO$_3$, also 3 mg Ca ions and Mg ions and 10 mg undissolved Ca compounds and Mg compounds. The solution has a pH value of 10.5 and a temperature of 70° C. Activated coke is used in the adsorber 2 and 2 m$^3$ of the cation exchange resin LEWATIT TP 208 are used in each of the ion exchange stages 6, 7 and 8. The stages 6, 7 and 8 are connected in series. HCl at a rate of 30 kg/h is added to the solution through line 11 whereby the pH value is decreased from 10.5 to 7.5. The following values relating to Ca ions, Mg ions, Mg-containing solids (Mg-solid) and pH values are measured in the various lines.

| Line | 5 | 10 | 16 | 17,24,25 | 19 |
|---|---|---|---|---|---|
| Ca$^{2+}$ + Mg$^{2+}$ (mg/l) | 3 | 0.02 | 0.5 | 0.02 | 0.02 |
| Mg-solid (mg/l) | 1.5 | 0.5 | 0 | 0 | 0 |
| pH | 10.5 | 10.5 | 7.5 | 7.5 | 7.5 |

The content of Ca-containing solids has entirely disappeared already in line 10.

We claim:

1. A process for obtaining a finely purified aqueous alkali chloride solution for use in membrane electrolysis, comprising the steps of:
    (a) providing a first aqueous alkali chloride solution which contains calcium ions, magnesium ions and undissolved magnesium compounds;
    (b) feeding said first aqueous alkali chloride solution to a first ion exchange state at a pH value of about 10 to 11, and removing calcium ions and magnesium ions from said first aqueous alkali chloride solution in said first ion exchange stage by taking up the calcium and magnesium ions on an ion exchange resin of the first ion exchange stage, withdrawing the first solution from said first stage, the withdrawn first solution containing undissolved magnesium compounds and also containing a total content of calcium ions and magnesium ions of less than 0.1 mg/l;
    (c) adding an acid to the first solution withdrawn from said first stage and producing a second aqueous alkali chloride solution by acidifying the first solution withdrawn from said first stage, maintaining the pH value of said second solution in the range of 5 to 9 by said adding of an acid, by said adding of an acid decreasing the pH of the first solution withdrawn from said first stage by at least 0.5 and dissolving the undissolved magnesium compounds in said second solution;
    (d) passing the second solution through at least a second ion exchange stage and removing calcium ions and magnesium ions on an ion exchange resin from the second solution in said second stage, the second solution being fed to the second ion exchange stage having a pH of 5 to 9; and
    (e) withdrawing a finely purified aqueous alkali chloride solution from step (d) which is virtually free from undissolved magnesium compounds, the total concentration of calcium ions and magnesium ions in said finely purified solution being not in excess of 0.05 mg/l.

* * * * *